(12) United States Patent
Stephenson et al.

(10) Patent No.: US 7,153,091 B2
(45) Date of Patent: Dec. 26, 2006

(54) GAS TURBINE ENGINE

(75) Inventors: Nigel D Stephenson, Derby (GB); Colin E Scrase, Derby (GB)

(73) Assignee: Rolls-Royce plc, London (GB)

( * ) Notice: Subject to any disclaimer, the term of this patent is extended or adjusted under 35 U.S.C. 154(b) by 337 days.

(21) Appl. No.: 10/832,352

(22) Filed: Apr. 27, 2004

(65) Prior Publication Data
US 2004/0240985 A1 Dec. 2, 2004

(30) Foreign Application Priority Data
May 14, 2003 (GB) ................................ 0311007.9

(51) Int. Cl.
*F01D 21/00* (2006.01)
(52) U.S. Cl. ..................... 415/9; 415/174.4; 416/2
(58) Field of Classification Search ................ 415/9, 415/142, 174.4, 229; 416/2, 174; 60/223, 60/226.1
See application file for complete search history.

(56) References Cited

U.S. PATENT DOCUMENTS

| | | | | |
|---|---|---|---|---|
| 5,417,501 A | * | 5/1995 | Hyde et al. | 384/542 |
| 6,073,439 A | * | 6/2000 | Beaven et al. | 60/223 |
| 6,082,959 A | * | 7/2000 | Van Duyn | 415/9 |
| 6,428,269 B1 | | 8/2002 | Boratgis | |
| 6,494,032 B1 | * | 12/2002 | Udall et al. | 60/223 |

FOREIGN PATENT DOCUMENTS

| | | |
|---|---|---|
| GB | 2326679 A | 12/1998 |
| GB | 2360069 A | 9/2001 |

* cited by examiner

*Primary Examiner*—Edward K. Look
*Assistant Examiner*—Nathan Wiehe
(74) *Attorney, Agent, or Firm*—W. Warren Taltavull; Manelli Denison & Selter PLLC

(57) ABSTRACT

A turbofan gas turbine engine (10) comprises a fan rotor and a compressor rotor (62). The fan rotor (24) carries a plurality of circumferentially spaced radially outwardly extending fan blades (26). The compressor rotor carries a plurality of circumferentially spaced radially outwardly extending compressor blades (64). The fan rotor (24) is mounted on a fan shaft (38) and the compressor rotor (62) is mounted on a compressor shaft (68). The compressor shaft (68) is arranged around the fan shaft (38). The fan rotor (24) is rotatably mounted on a support structure (40) by a first bearing (50) and the compressor rotor (62) is rotatably mounted on the support structure (40) by a second bearing (58) spaced axially from the first bearing (50). The fan and compressor rotors (24, 62) are normally arranged coaxially with each other and with the support structure (40). The first bearing (50) is connected to the support structure (40) by a first frangible connection (54) and the second bearing (58) is connected to the support structure (40) by a second frangible connection (61).

10 Claims, 2 Drawing Sheets

GAS TURBINE ENGINE

The present invention relates to a gas turbine engine and in particular to a turbofan gas turbine engine.

Gas turbine engines generally comprise in flow series a compressor section, a combustion section and a turbine section. A turbofan gas turbine also comprises a fan section in flow series before the compressor section.

Gas turbine engines generally comprise compressor rotors that are connected to turbine rotors by shafts. The compressor rotors carry large numbers of compressor rotor blades and the turbine rotors carry large numbers of turbine rotor blades. Turbofan gas turbine engines include a fan rotor, at their upstream end, which carries a plurality of fan rotor blades. The fan rotor does not have the highest rotational speed in comparison to the compressor rotors, but the fan rotor carries the fan rotor blades, which have the highest mass-moment measured from the engine axis and the highest centrifugal forces when the engine is operating.

Turbofan gas turbine engines are designed such that the fan blades will not detach from the fan rotor in normal operation. However, it is possible for a fan blade, or a portion of a fan blade, to become detached from the fan rotor when a large foreign object, e.g. a large bird, enters the turbofan gas turbine engine. In the event of the loss of a fan blade, or a portion of a fan blade, from the fan rotor, the kinetic energy of the detached fan blade, or portion of the fan blade, is absorbed by a fan containment casing. There is a high load on the fan rotor's support as the fan rotor tries to move in the opposite direction to the released fan blade. There is a high cyclic load as the fan rotor continues to rotate with a large unbalance due to the loss of the fan blade or portion of the fan blade. There is a high cyclic load as the aircraft flies with the fan rotor forced to rotate by the airflow passing through the engine. These high cyclic load levels are largely dependent upon the effective unbalance of the fan rotor and the amount of support offered to the fan rotor.

Accordingly the present invention seeks to provide a novel gas turbine engine, which reduces, preferably overcomes, the above-mentioned problems of high cyclic loads.

Accordingly the present invention provides a gas turbine engine comprising a first rotor and at least a second rotor, the first rotor carrying a plurality of circumferentially spaced radially outwardly extending rotor blades, the second rotor carrying a plurality of circumferentially spaced radially outwardly extending rotor blades, the first rotor being mounted on a first shaft, the second rotor being mounted on a second shaft, the second shaft being arranged around the first shaft, the first rotor being rotatably mounted on a support structure by a first bearing, the second rotor being rotatably mounted on the support structure by a second bearing spaced axially from the first bearing, the first and second rotors being normally arranged coaxially with each other and with the support structure, the first bearing being connected to the support structure by a first frangible connection and the second bearing being connected to the support structure by a second frangible connection.

Preferably the second rotor is connected to the second shaft by a third frangible connection.

Preferably the gas turbine engine comprises a third rotor carrying a plurality of circumferentially spaced radially outwardly extending rotor blades, the third rotor being mounted on a third shaft, the third shaft being arranged around the second shaft.

Preferably the first rotor is afan rotor carrying a plurality of fan blades, the second rotor is an intermediate-pressure compressor rotor carrying intermediate-pressure compressor blades and the third rotor is a high-pressure compressor rotor carrying high-pressure compressor blades. A low-pressure turbine may drive the first shaft, the second shaft is driven by an intermediate-pressure turbine and the third shaft is driven by a high-pressure turbine.

Alternatively the first rotor is a fan rotor carrying a plurality of fan blades, the second rotor is a high-pressure compressor rotor carrying high-pressure compressor blades. The first shaft may be driven by a low-pressure turbine, the second shaft is driven by a high-pressure turbine.

Preferably the support structure comprises a first frustoconical member, a second frustoconical member, a cylindrical member and an engine casing, the radially outer ends of the first and second frustoconical members are secured to the engine casing, the radially inner ends of the first and second frustoconical members are connected to the cylindrical member.

Preferably the first frangible connection is between the first bearing and the cylindrical member. Alternatively the first frangible connection may be between the first frustoconical member and the cylindrical member. The first frangible connection may be between the first bearing and the first frustoconical member.

Preferably the second frangible connection is between the second bearing and the cylindrical member. Alternatively the second frangible connection may be between the second frustoconical member and the cylindrical member. The second frangible connection may be between the second bearing and the second frustoconical member.

Preferably the first frangible connection comprises a plurality of frangible bolts or frangible pins.

Preferably the second frangible connection comprises a plurality of frangible bolts or frangible pins.

Preferably the third frangible connection comprises a plurality of frangible bolts or frangible pins.

The present invention will be more fully described by way of example with reference to the accompanying drawings in which.

Figure 1:
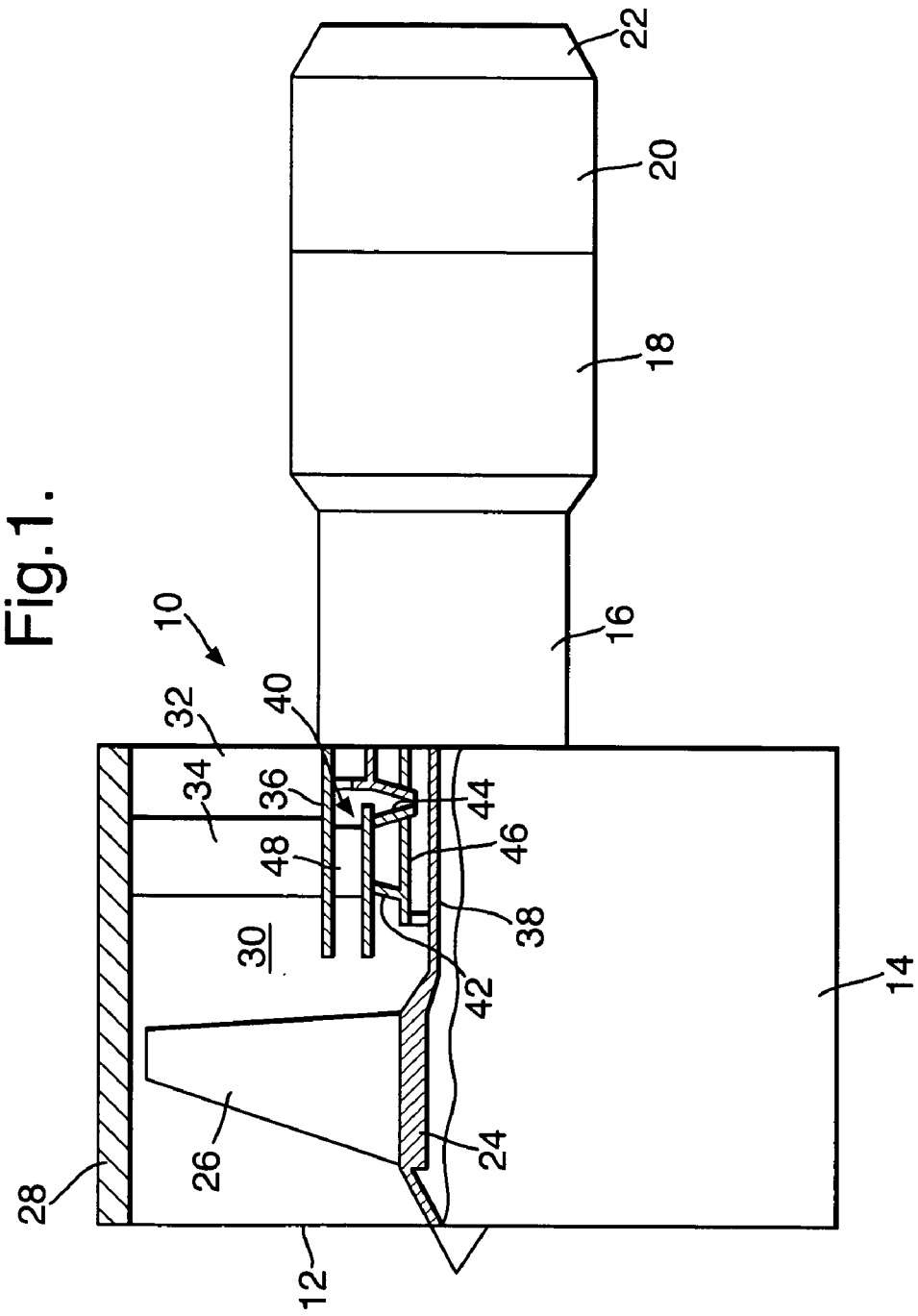
FIG. 1 is a partially cut away view of a turbofan gas turbine engine according to the present invention.

A turbofan gas turbine engine 10, as shown in FIG. 1, comprises in axial flow series an intake 12, a fan section, 14, a compressor section, 16, a combustion section 18, a turbine section 20 and an exhaust 22. The turbine section 20 comprises one or more turbines (not shown) arranged to drive one or more compressors 62 in the compressor section 16. The turbine section 20 may comprise a high-pressure turbine arranged to drive a high-pressure compressor or a high-pressure turbine arranged to drive a high-pressure compressor and an intermediate-pressure turbine arranged to drive an intermediate-pressure compressor. The turbine section also comprises a low-pressure turbine (not shown) arranged to drive a fan rotor 24 in the fan section 14.

Figure 2:
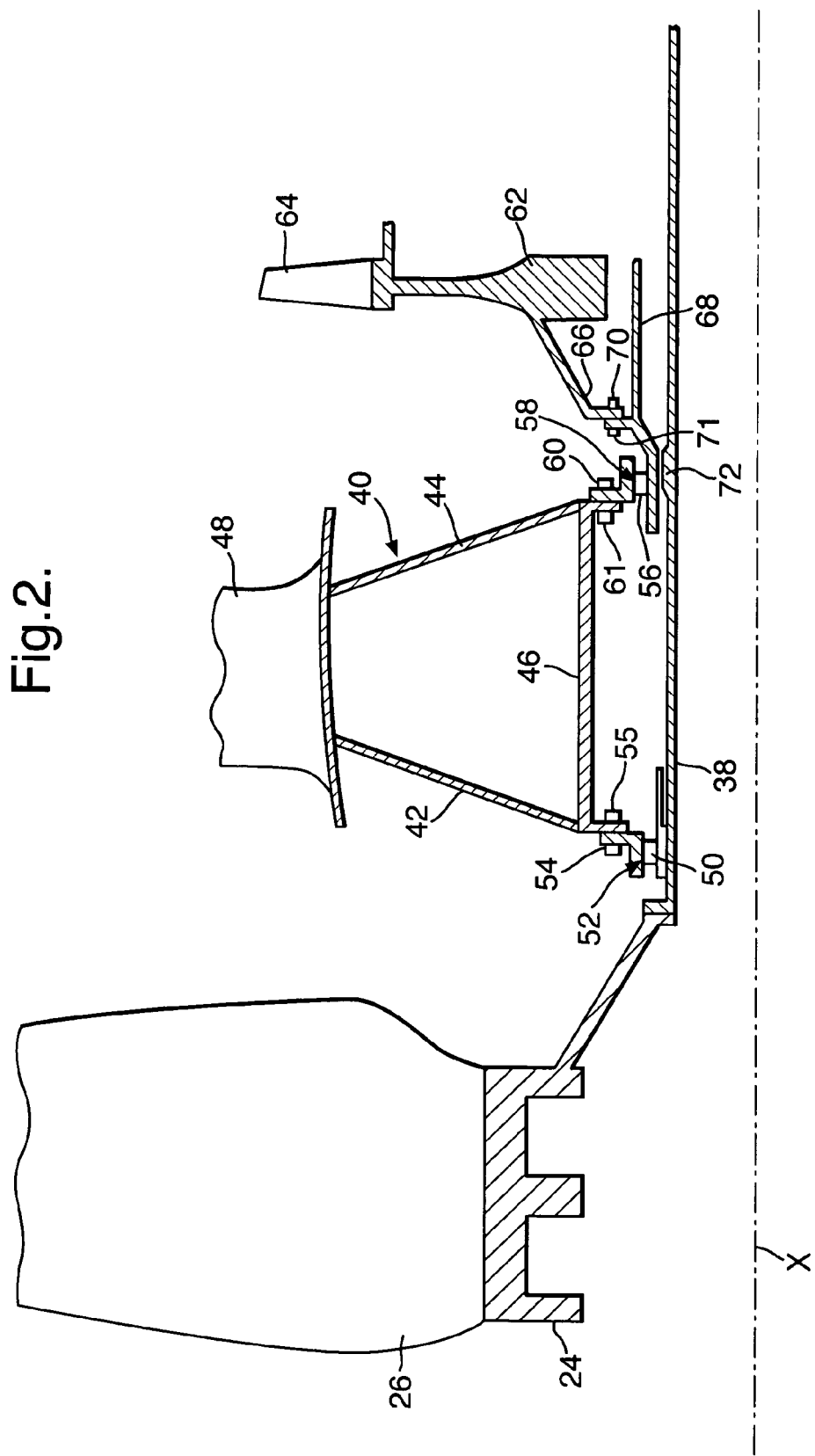
FIG. 2 is an enlarged cross-sectional view through a portion of the turbofan gas turbine engine shown in FIG. 1.

The fan section 14 also comprises, as shown more clearly in FIG. 2, a fan rotor 24 carrying a plurality of circumferentially spaced radially outwardly extending fan blades 26. The fan rotor 24 and fan blades 26 are surrounded by a fan casing 28, which is arranged coaxially with the fan rotor 24. The fan casing 28 partially defines a fan duct 30 and the fan duct 30 has a fan exhaust 32 at its downstream end. The fan casing 28 is secured to a core engine casing 36 by a plurality of circumferentially spaced radially extending fan outlet guide vanes 34, which extend between and are secured to the fan casing 28 and the core engine casing 36. The fan rotor 24 is connected to a turbine (not shown) by an axially extending fan shaft 38. The upstream end of the fan shaft 38 is rotatably mounted in a bearing housing 40.

The bearing housing 40 comprises an upstream frustoconical bearing panel 42, a downstream frustoconical bearing panel 44 and a cylindrical bearing hub 46 secured to the radially inner ends of the bearing panels 42 and 44. The radially outer ends of the frustoconical bearing panels 42 and 44 are secured to the radially inner ends of a stage of inlet guide vane 48. The radially outer ends on the stage of inlet guide vanes 48 are secured to the core engine casing 36.

The fan shaft 38 is rotatably mounted in a roller bearing 50, which has an outer race 52 secured to the upstream end of the cylindrical bearing hub 46. The outer race 52 is secured to the cylindrical bearing hub 46 by a plurality of nuts 55 and bolts 54. The bolts 54 are designed to be frangible at a preselected load.

The compressor rotor 62, either an intermediate-pressure compressor or a high-pressure compressor, carries a plurality of axially spaced stages of compressor rotor blades 64. Each stage of compressor rotor blades 64 comprises a plurality of circumferentially spaced radially outwardly extending compressor rotor blades 64. The compressor rotor 62 includes a drive member 66 which extends in an axially upstream direction and is secured to a compressor shaft 68 by a plurality of nuts 70 and bolts 71. The bolts 70 are designed to be frangible at a predetermined load.

The compressor shaft 68 is rotatably mounted in the bearing housing 40. The compressor shaft 68 is mounted in a roller bearing 56, which has an outer race 58 secured to the downstream end of the cylindrical bearing hub 46. The outer race 58 is secured to the cylindrical bearing hub 46 by a plurality of nuts 61 and bolts 60. The bolts 60 are designed to be frangible at a preselected load.

In operation of the turbofan gas turbine engine 10 in the event of a fan blade 26, or a part of a fan blade 26, becoming detached from the fan rotor 24, for example due to an impact of a large foreign object, such as a bird, while the engine is rotating at high speeds the fan rotor 24 and fan blades 26 becomes unbalanced. An unbalance force is applied to the fan rotor 24 resulting in a load being transmitted through the fan shaft 38 and the bearing 50 to the engine structures e.g. the bearing housing 40 and core engine casing 36. If this load exceeds the predetermined strength of the bolts 54, then the frangible bolts 54 break and allow the fan rotor 24 and fan blades 26 to orbit about the engine axis X without transmitting the full load to the engine structures, e.g. the bearing housing 40 and core engine casing 36.

As the orbit of the fan rotor 24 and fan blades 26 increases in distance from the axis X, a bumper bearing 72 on the outer surface of the fan shaft 38 radially contacts the compressor shaft 68 at substantially the same axial position as the roller bearing 58 and this results in loads being transmitted through the fan shaft 38, the bumper bearing 72, the compressor shaft 68 and the roller bearing 58 to the engine structure, e.g. the bearing housing 40 and core engine casing 36.

If this load exceeds the predetermined strength of the bolts 61, then the frangible bolts 61 break and allow the fan rotor 24 and fan blades 26 to orbit about the engine axis X at a larger distance from the engine axis X without transmitting the full load to the engine structures, e.g. the bearing housing 40 and core engine casing 36.

As the orbit of the fan rotor 24 and fan blades 26 further increases in distance from the axis X, this results in loads being transmitted through the fan shaft 28, the bumper bearing 72, the compressor shaft 68, the drive member 66, compressor rotor 62 and the compressor rotor blades 64 to the engine structure, e.g. the core engine casing 36.

If this load exceeds the predetermined strength of the bolts 70, then the frangible bolts 70 break and allow the fan rotor 24 and fan blades 26 to orbit about the engine axis X at an even larger distance from the engine axis X without transmitting the full load to the engine structures, e.g. the bearing housing 40 and core engine casing 36.

The radial distance between the cylindrical hub 46 and the fan shaft 38 is arranged to be large enough to allow the sequential failure of the bolts 54, 61 and 70.

The frangible connections 54, 61 and 70 fail sequentially to partially isolate the unbalanced fan rotor 24 from the major engine structures and lower the first natural frequency of the unbalanced fan rotor 24 and hence allow the fan rotor 24 to rotate about its new centre of gravity position, whilst the rotational speed of the fan rotor 24 is above the first natural frequency of the fan rotor 24. The breaking of the frangible connections 54, 61 and 70 alters the dynamic response of the fan rotor 24 and fan shaft 38 such that the first natural frequency of the fan rotor 24 and fan shaft 38 is well below the maximum rotational speed of the fan rotor 24 and that the fan rotor 24 tries to spin around its centre of gravity and hence limit its orbit. If a rotor is unbalanced, then at rotational speeds above its first natural frequency the rotor will generally attempt to spin around its centre of gravity and at rotational speeds below its first natural frequency the orbit of the rotor will generally be much greater because the heavier side of the rotor is forced radially outwards. Associated with this reduced orbit is a reduction in the peak level of load that is transmitted to the major engine structures that remain intact.

The advantage of the present invention is that the series of frangible connections enables the weight of some of the engine structures loaded during the high speed unbalance events of the fan rotor to be significantly reduced compared to engine structures that would be required without these frangible connections. Also where there is a higher than expected level of unbalance of the fan rotor, then the sequential failure of the frangible connections provides additional protection to the engine structure. The provision of a series of frangible connections enables sequential failure of the frangible connections and hence a more controlled failure.

Although the present invention has been described with reference to frangible bolts, the frangible connection may be any suitable type of connection, for example frangible pins, frangible spigots etc. Although the present invention has been described with reference to a frangible connection between the bearing and the cylindrical member of the bearing housing of the support structure, there may be a frangible connection between the cylindrical member and the frustoconical member of the bearing housing or between the bearing and the frustoconical member.

Although the present invention has been described with reference to a gas turbine engine with three shafts, the present invention is equally applicable to a gas turbine engine with two or more shafts.

We claim:

1. A gas turbine engine comprising a first rotor and at least a second rotor, the first rotor carrying a plurality of circumferentially spaced radially outwardly extending rotor blades, the second rotor carrying a plurality of circumferentially spaced radially outwardly extending rotor blades, the first rotor being mounted on a first shaft, the second rotor being mounted on a second shaft, the second shaft being arranged around the first shaft, the first rotor being rotatably mounted on a support structure by a first bearing, the second rotor being rotatably mounted on the support structure by a second bearing spaced axially from the first bearing, the first and second rotors being normally arranged coaxially with each other and with the support structure, the first bearing being connected to the support structure by a first frangible connection and the second bearing being connected to the support structure by a second frangible connection.

2. A gas turbine engine as claimed in claim 1 wherein the second rotor is connected to the second shaft by a third frangible connection.

3. A gas turbine engine as claimed in claim 2 wherein the third frangible connection comprises a plurality of frangible bolts or frangible pins.

4. A gas turbine engine as claimed in claim 1 wherein the first rotor is a fan rotor carrying a plurality of fan blades, the second rotor is a high-pressure compressor rotor carrying high-pressure compressor blades.

5. A gas turbine engine as claimed in claim 4 wherein the first shaft is driven by a low-pressure turbine, the second shaft is driven by a high-pressure turbine.

6. A gas turbine engine as claimed in claim 1 wherein the support structure comprises a first frustoconical member, a second frustoconical member, a cylindrical member and an engine casing, the radially outer ends of the first and second frustoconical members are secured to the engine casing, the radially inner ends of the first and second frustoconical members are connected to the cylindrical member.

7. A gas turbine engine as claimed in claim 6 wherein the first frangible connection is between the first bearing and the cylindrical member.

8. A gas turbine engine as claimed in claim 6, wherein the second frangible connection is between the second bearing and the cylindrical member.

9. A gas turbine engine as claimed in claim 1 wherein the first frangible connection comprises a plurality of frangible bolts or frangible pins.

10. A gas turbine engine as claimed in claim 1 wherein the second frangible connection comprises a plurality of frangible bolts or frangible pins.

* * * * *